US007274929B1

(12) United States Patent
Banginwar

(10) Patent No.: US 7,274,929 B1
(45) Date of Patent: Sep. 25, 2007

(54) POWER MANAGEMENT WITHIN A WIRELESS COMMUNICATION SYSTEM

(76) Inventor: Rajesh P. Banginwar, 2830 NW. Overlook Dr., 2223, Hillsboro, OR (US) 97124

( * ) Notice: Subject to any disclaimer, the term of this patent is extended or adjusted under 35 U.S.C. 154(b) by 747 days.

(21) Appl. No.: 10/320,177

(22) Filed: Dec. 16, 2002

(51) Int. Cl.
*H04M 3/10* (2006.01)
(52) U.S. Cl. ............... 455/418; 455/574; 455/432.3
(58) Field of Classification Search ............... 455/13.4, 455/572, 574, 450, 556, 343, 84, 115, 343.1, 455/127.1, 41.2, 432.3, 186.1, 550.1, 418, 455/127.5; 370/338, 311, 374
See application file for complete search history.

(56) References Cited

U.S. PATENT DOCUMENTS

| 6,532,375 | B2 * | 3/2003 | Cathey et al. ............... 455/574 |
| 6,674,738 | B1 * | 1/2004 | Yildiz et al. ................. 370/338 |
| 2003/0193895 | A1 * | 10/2003 | Engwer et al. ............. 370/241 |
| 2004/0041538 | A1 * | 3/2004 | Sklovsky .................... 320/127 |
| 2004/0103278 | A1 * | 5/2004 | Abhishek et al. ........... 713/160 |
| 2004/0204175 | A1 * | 10/2004 | Karaoguz et al. ........... 455/572 |
| 2004/0204183 | A1 * | 10/2004 | Lencevicius et al. ....... 455/574 |

OTHER PUBLICATIONS

R. Loy and A. Helal, "Active Mode Power Management for Mobile Devices," Proceedings of the Fifth World Multi-Conf. on Systematics, Cybernetics, and Informatics, Jul. 2001, Orlando, FL.
R. Kravets and P. Krishnan, "Application-Driven Power Management for Mobile Communication," Wireless Networks 6, pp. 263-277, Jul. 2000.

* cited by examiner

*Primary Examiner*—Edward F. Urban
*Assistant Examiner*—Tu X. Nguyen
(74) *Attorney, Agent, or Firm*—The Law Offices of John C. Scott, LLC; John C. Scott

(57) ABSTRACT

Enhanced power management is achieved in a wireless communication system. In one aspect of the invention, power management profiles related to application type are used to achieve enhanced power management. In another aspect of the invention, the interval at which buffered broadcast and multicast traffic is transmitted to users in a network is adjusted during system operation based on a predetermined adjustment criterion to achieve enhanced power management.

23 Claims, 4 Drawing Sheets

FIRST TIME PERIOD

SECOND TIME PERIOD

POWER MANAGEMENT WITHIN A WIRELESS COMMUNICATION SYSTEM

BACKGROUND OF THE INVENTION

The growth of wireless communications has ushered in a wide range of portable and mobile communications applications. Typically, such applications involve the use of at least one mobile communication device having a depletable power source (e.g., a battery). As can be appreciated, battery powered devices can only be used for a limited time period before battery recharge or battery replacement is required. Often, a user will be in a situation where battery recharge or replacement is not possible and the user will therefore be cut off from communication when the battery dies. To alleviate this problem, power management processes have been developed to better control the consumption of power within such devices during normal operation and thus extend battery life. However, many current power management techniques are limited in their ability to effectively reduce power consumption. Thus, there is a general need for new structures and techniques for implementing power management in wireless systems.

DETAILED DESCRIPTION

Figure 1:
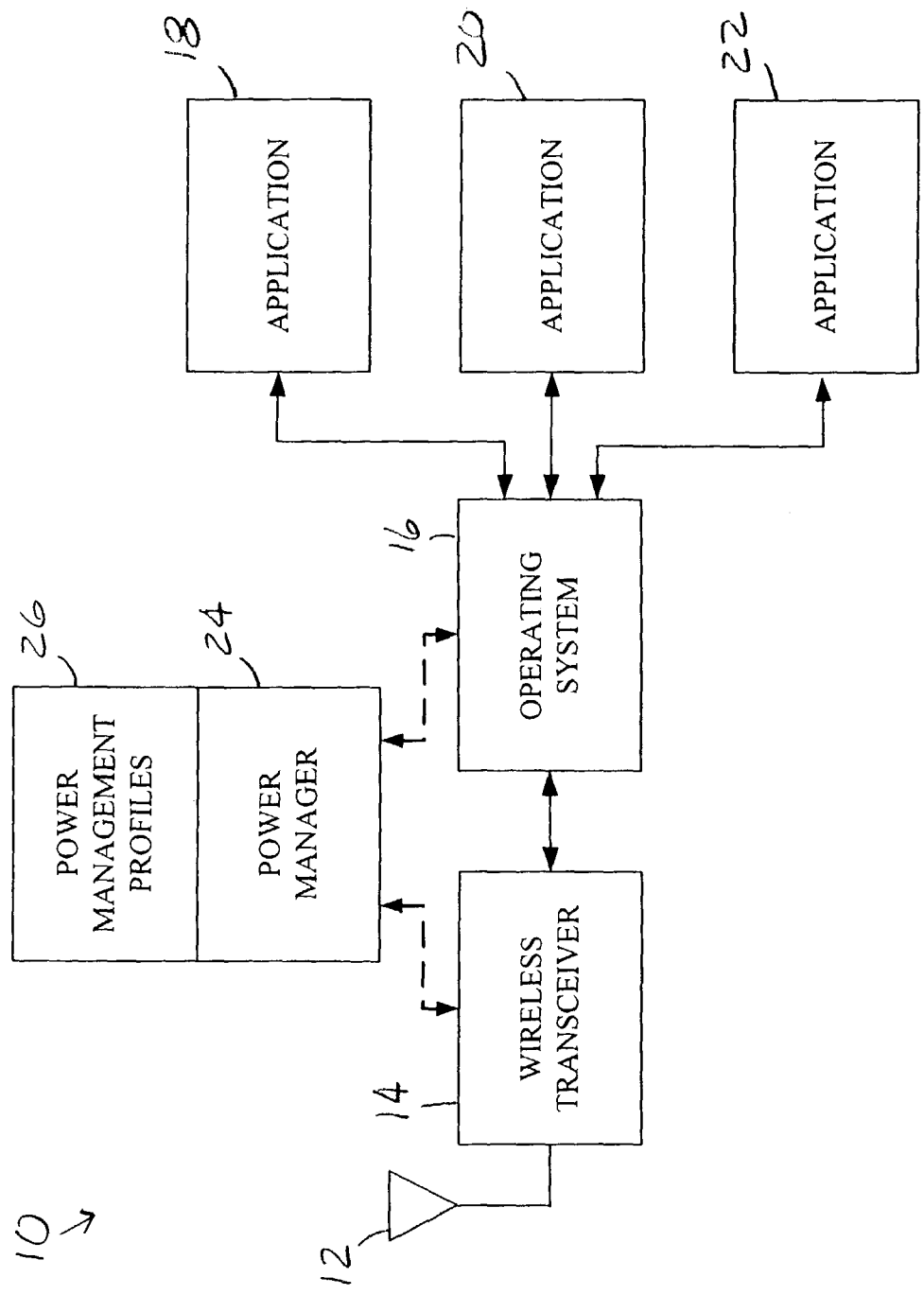
FIG. 1 is a block diagram illustrating a user device in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a block diagram illustrating a user device 10 in accordance with an embodiment of the present invention. As illustrated, the user device 10 includes: an antenna 12, a wireless transceiver 14, an operating system 16, a plurality of application programs 18, 20, 22, a power manager 24, and a plurality of power management profiles 26. The wireless transceiver 14 is capable of supporting wireless communication between the user device 10 and a remote entity, via antenna 12. The application programs 18, 20, 22 are programs that are used to perform specific functions for a user and may include, for example, word processors, spreadsheets, Internet browsers, email programs, drawing programs, and/or others. The operating system 16 is a program that manages the application programs 18, 20, 22 and provides an interface between the application programs 18, 20, 22 and various hardware elements within the user device 10 (e.g., the transceiver 14, etc.). In one approach, the operating system 16 is loaded from a mass storage unit into a random access memory (RAM) within the device 10 upon startup of the device 10, after which it is executed by one or more digital processors within the device 10. The application programs 18, 20, 22 can each be individually loaded into RAM and executed during operation of the device 10. Many operating systems will allow two or more applications to be executed at the same time within the resident processor(s) (e.g., multitasking systems).

The user device 10 can take any of a wide variety of different forms including, for example, a laptop computer, a personal digital assistant (PDA), a tablet computer, a pager, a cellular telephone or other form of wireless communicator, as well as others. In at least one embodiment, the wireless transceiver 14 is a removable module that can be inserted into and removed from the user device 10 (e.g., a PC card, an expansion board, or other removable module that may be inserted into a port of the device 10). A non-removable wireless transceiver 14 may also be used. The wireless transceiver 14 will typically be configured to operate in accordance with one or more wireless communication standards (e.g., IEEE 802.11(a), (b), (g), HyperLAN 1, 2, HomeRF, Bluetooth, Ultrawideband, and/or others). In at least one implementation, the wireless transceiver 14 is an IEEE 802.11-based transceiver card.

The power manager 24 is operative for managing the operation of the wireless transceiver 14 in a manner that reduces overall power consumption within the user device 10. By reducing power consumption, the power manager 24 can increase the life of any depletable power sources within the device 10 and thus reduce the frequency with which such power sources need to be recharged or replaced. The power management profiles 26 may include a group of individual profiles that are each associated with a specific type of application. In at least one embodiment, each profile includes information relating to typical transceiver usage patterns within a communication device for an associated application type. As used herein, the phrases "type of application" and "application type" are not limited to broad application categories such as Internet browsers, email programs, etc. That is, the terms may also apply to narrower application groupings including, for example, individual commercial application programs (e.g., Microsoft Internet Explorer, Netscape Navigator, etc.). For example, in one embodiment, the power management profiles 26 may include a first profile corresponding to email programs, a second profile corresponding to browser programs, and so on. In another embodiment, the power management profiles 26 may include a first profile corresponding to Microsoft Internet Explorer, a second profile corresponding to Windows Media Player, a third profile corresponding to Microsoft Outlook, and so on. Other embodiments may include individual profiles for different versions of commercial software packages. Further, the power management profiles 26 may include profiles following more than one categorization technique (e.g., broad application categories, individual programs, etc. within a single unit).

When a currently executing application requests transceiver services through the operating system 16, the power manager 24 determines the type of application that is requesting the services and retrieves the corresponding profile from the power management profiles 26. The power manager 24 then causes the wireless transceiver 14 to be operated in accordance with the selected power management profile. As described above, each power management profile may be indicative of typical transceiver usage patterns within a communication device for an associated application type. Thus, in at least one embodiment, a profile will allow the power manager 24 to switch the wireless transceiver 14 between high and low power states based on the typical usage patterns of the corresponding application type. In this manner, enhanced power savings may be achieved with reduced impact on the quality of the communication services being provided.

In at least one embodiment of the invention, the power manager 24 is configured to handle the situation where two or more applications are requesting services of the wireless transceiver 14 within a common time period. In one approach, for example, the power manager 24 retrieves a power management profile for each of the requesting applications and implements a power management procedure based on the superset of the two profiles. For example, if an email application is expecting emails at the same time that an Internet browser is actively browsing the Internet, the power manager 24 may use a superset of an email profile and a browser profile so that the transceiver 14 will not go into low power mode (e.g., power save mode in an IEEE 802.11 based system) directly after completion of the hypertext transfer protocol (HTTP) request but will instead wait for a period of time to avoid significant delays to the email application.

The power manager 24 can be implemented in a variety of different ways including, for example, hardware, software, firmware, and/or hybrid implementations. In one possible approach, the power manager 24 (or a portion thereof) is installed as an operating system driver (or other similar program or programs) within the user device 10. This may be performed, for example, as part of the installation procedure for the wireless transceiver 14. The driver or other program(s) may be located on a storage medium (e.g., a floppy disk, a CD ROM, etc.) from which it can be loaded into the user device 10. In another approach, the power management functionality (or a portion thereof) is part of the original operating system software. In still another approach, the power manager 24 is part of the wireless transceiver 14. The power management functionality may also be split between the transceiver 14 and the operating system 16. The power manager 24 can alternatively be implemented as a separate hardware, software, or firmware element within the user device 10 (e.g., as a separate card, board, chip, etc.). Other implementations are also possible. The power management profiles 26 will typically be stored within a memory in the user device 10. Any type of digital memory can be used. The profiles can be loaded into the device 10 during, for example, the installation procedure for the wireless transceiver 14 (e.g., as part of the driver information, etc.). The power management profiles 26 may alternatively be part of the original operating system software. In another approach, the power management profiles 26 can be stored within a memory in the wireless transceiver 14. In at least one embodiment, a separate wireless transceiver module having both the power manager 24 and the power management profiles 26 is provided.

Figure 2:
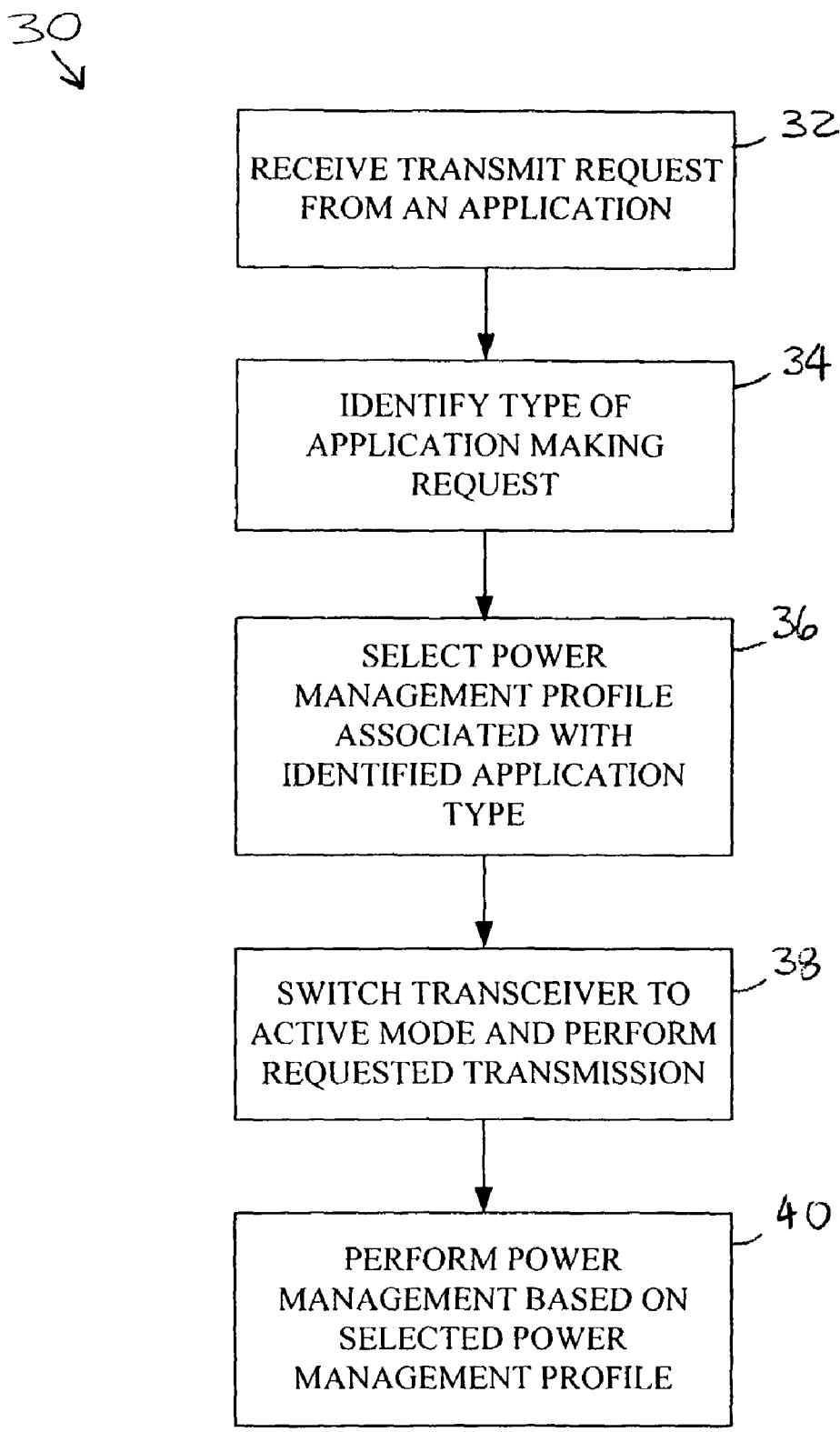
FIG. 2 is a flowchart illustrating a method to perform power management for a wireless transceiver in accordance with an embodiment of the present invention.

FIG. 2 is a flowchart illustrating a method 30 to perform power management for a wireless transceiver in accordance with an embodiment of the present invention. A transmit request is first received from an application (block 32). The type of application making the request is identified (block 34). A power management profile that is associated with the identified application type is next selected from a group of profiles (block 36). The wireless transceiver is then switched to active mode and the requested transmission is performed (block 38). Power management is then performed based on the selected power management profile (block 40).

In at least one embodiment, the wireless transceiver 14 is configured in accordance with the IEEE 802.11 wireless networking standard. In such an embodiment, power management will typically entail managing the transition of the wireless transceiver between "active mode" and "power save mode." In one possible operational scenario, for example, an HTTP transmit request is received from an Internet browser. In response thereto, the wireless transceiver is switched to the active mode and the HTTP transmit request is carried out. Power management is thereafter implemented in accordance with an Internet browser power management profile. In accordance with the power management profile, the wireless transceiver is switched to power save mode shortly after the requested transmission has been made. The wireless transceiver is then periodically switched back to the active mode to check for an HTTP response. After a first delay period, the frequency with which the wireless transceiver is switched to the active mode is decreased. After a second delay period, the wireless transceiver is switched back to power save mode to wait for the next transmit request from an application. The above operational sequence represents one possible power management procedure that may be implemented for Internet browsers. Many alternative power management procedures may similarly be used.

The IEEE 802.11 wireless standard defines an infrastructure network architecture in which one or more mobile devices (called "stations" or "STAs" under the standard) communicate wirelessly to and through an access point (AP). The AP, in turn, is in communication with a larger network through some form of distribution system (DS). The set of stations associated with a particular AP in an infrastructure network is known as a "basic service set" or BSS under the standard. There may be more than one AP (and thus more than one BSS) within a particular infrastructure network. An AP in an infrastructure network periodically transmits a beacon signal to the STAs within the corresponding BSS. The beacon signals each contain management related information (e.g., a time stamp for synchronization, the beacon interval, etc.) that may be used by the individual STAs within the BSS to support proper operation. One of the items included in the beacon signal is a traffic indication map (TIM) that identifies each STA within the BSS that currently has data buffered within the AP that is waiting to be transferred to the STA. A data frame that is directed to a single recipient STA within the network is known as a "unicast" frame. The IEEE 802.11 standard specifies methods for a STA to obtain such buffered unicast frames from the AP when the STA is listed in the TIM.

Figure 3:
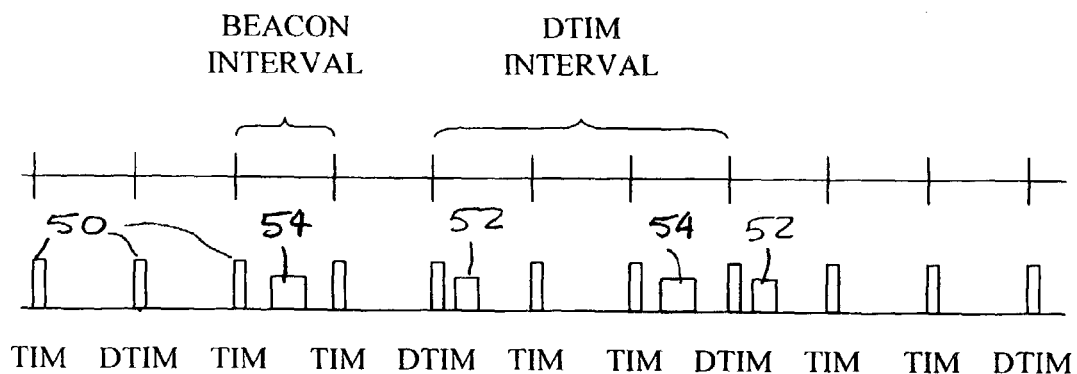
FIG. 3 is a timing diagram illustrating a series of beacon signals that may be transmitted by an access point within an IEEE 802.11 infrastructure network.

In addition to unicast traffic, the IEEE 802.11 standard also supports broadcast and multicast traffic. A broadcast frame is one that is addressed to all STAs within a system and a multicast frame is one that is addressed to multiple STAs in the system. According to the standard, all broadcast and multicast traffic within an infrastructure network is to be buffered within a corresponding AP and then transmitted at a predetermined time. The predetermined time is defined by a delivery traffic indication map (DTIM) interval, which is a multiple of the beacon interval. As described above, the AP transmits a TIM with every beacon. Every DTIM interval, however, a TIM of type DTIM is transmitted within the beacon. The DTIM interval value is typically transmitted as part of the beacon signals within the BSS. FIG. 3 is a timing diagram illustrating a series of beacon signals 50 that may be transmitted by an AP within an infrastructure network under IEEE 802.11. In this example, a DTIM beacon is transmitted every third beacon; thus, the DTIM interval is three beacon periods. As illustrated, any multicast or broadcast traffic 52 that is buffered within the AP is transmitted just after the corresponding DTIM beacon. Unicast traffic 54, on the other hand, may be transmitted after an ordinary TIM beacon.

The STAs in an IEEE 802.11 network have two different power states; namely, (a) awake state during which the STA is fully powered and (b) doze or low power state during which the STA can neither transmit or receive. The STAs also have two different power management modes; namely, (a) active mode and (b) power save mode. The current power management mode of a STA will determine the manner in which the STA transitions between the two power states. When a STA is in active mode, the STA is always in the awake state and may receive frames at any time. When the STA is in power save mode, however, the STA is in the doze state and will only enter the awake state to: (a) receive selected beacons, (b) receive broadcast and multicast transmissions following DTIM beacons, (c) transmit, and (d) receive unicast transmissions at appropriate times (e.g., in response to a power save poll frame, etc.). When a STA desires to change its power management mode, it must notify the AP to which it is affiliated. The AP keeps track of the modes of all STAs within its BSS.

Access points that are configured in accordance with the IEEE 802.11 standard are typically pre-configured with a specific DTIM interval value. All STAs subsequently associated with the AP obtain the DTIM interval value via the beacon signals. During operation, the STAs in the BSS of an AP that are in power save mode must wake up every DTIM interval to determine whether there is any broadcast or multicast traffic buffered in the AP, whether or not such information is buffered. This results in a certain level of power consumption overhead in the system that is tied to the broadcast or multicast traffic. As described below, in one aspect of the present invention, methods and structures are provided to effectively reduce this broadcast/multicast related power consumption overhead.

Figure 4:
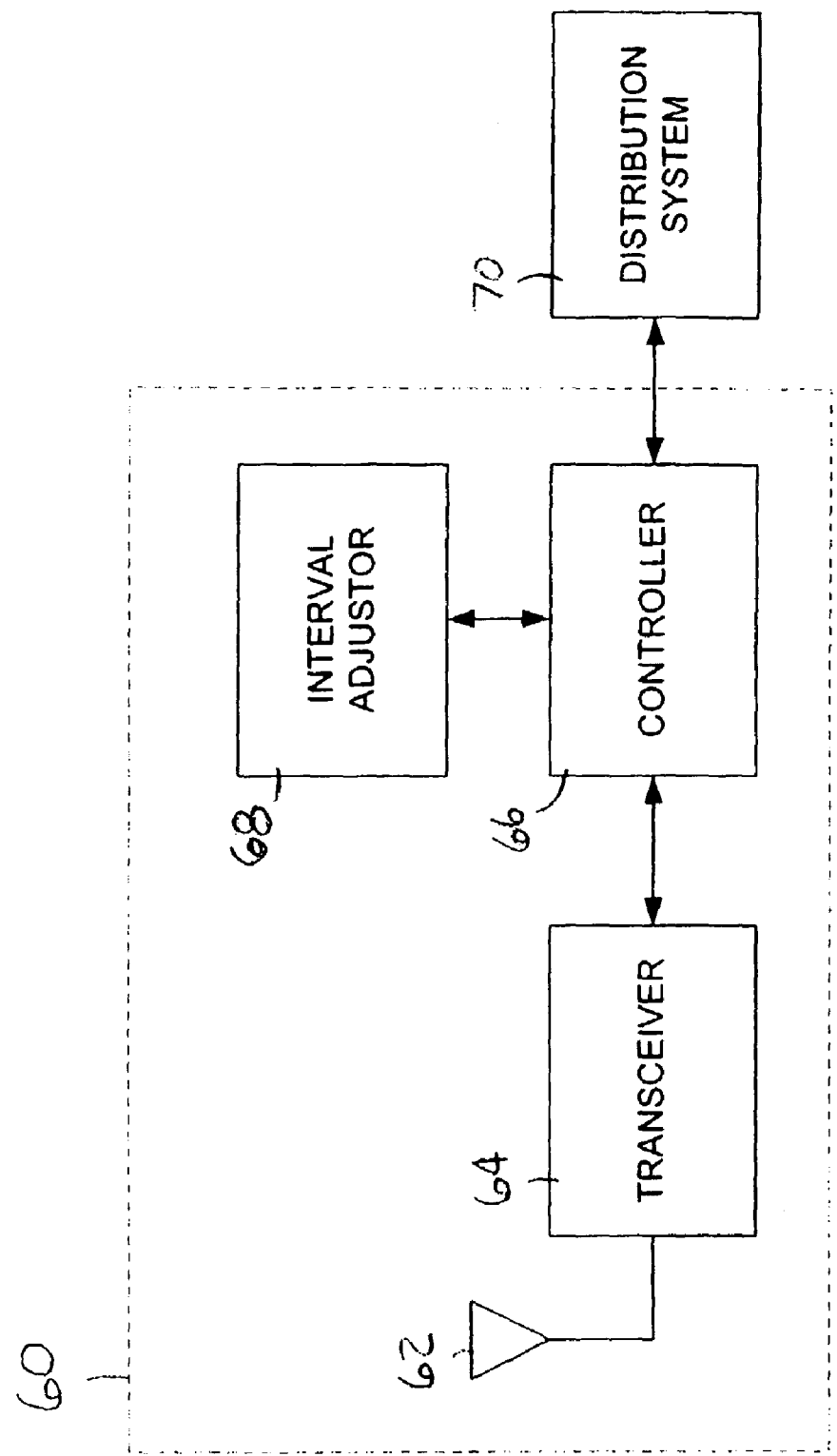
FIG. 4 is a block diagram illustrating an access point in accordance with an embodiment of the present invention.

FIG. 4 is a block diagram illustrating an access point (AP) 60 in accordance with an embodiment of the present invention. As illustrated, the AP 60 includes: an antenna 62, a transceiver 64, a controller 66, and an interval adjustor 68. The AP 60 may communicate wirelessly with the STAs in the corresponding BSS via the transceiver 64 and antenna 62. The AP 60 may be connected to a distribution system (DS) 70 which may, in turn, be connected to other APs and/or other sub-networks in an overall network. The controller 66 controls the operation of the AP 60 and also controls the flow of information between the transceiver 64 and the distribution system 70. The controller 66 will typically be configured in accordance with at least one wireless standard (e.g., IEEE 802.11). The interval adjustor 68 is operative for adjusting an interval at which buffered broadcast and multicast traffic is transmitted from the AP 60 during network operation. In at least one embodiment, the interval is adjusted based on a predetermined adjustment criterion. In an IEEE 802.11 based embodiment, the interval adjusted by the interval adjustor 68 is the DTIM interval discussed previously (see FIG. 3). The interval adjustor 68 may be implemented in a variety of ways including, for example, hardware, software, firmware, and hybrid implementations. In at least one embodiment, the interval adjustor 68 is implemented in software within a common processor with the controller functionality. The primary goal of the interval adjustor 68 is to reduce the overall broadcast/multicast related power consumption overhead. Although illustrated within an access point, it should be appreciated that the interval adjustor 68 may be located in a variety of different locations within a wireless network.

In one implementation, the interval adjustor 68 informs the controller 66 of each updated interval value. The controller 66 will then transmit the updated interval value to the corresponding user devices. In an IEEE 802.11 based embodiment, the interval adjustor 68 will deliver an updated DTIM interval value to the controller 66 which then causes the updated value to be transmitted to the STAs in the corresponding BSS via the beacon signals. In one approach, if the new DTIM value is smaller than the previous one, the new value will not become effective until after the next DTIM beacon. If the new DTIM value is larger than the previous one, the new value will become effective immediately. Other techniques for transitioning to the new DTIM value also exist.

Figure 5:
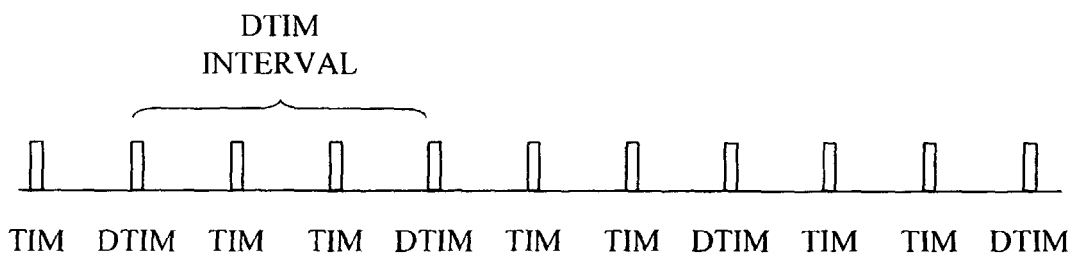
FIG. 5 is a diagram illustrating the dynamic adjustment of a DTIM interval in a wireless network in accordance with an embodiment of the present invention.
Figure 5:
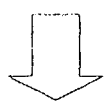
Figure 5:
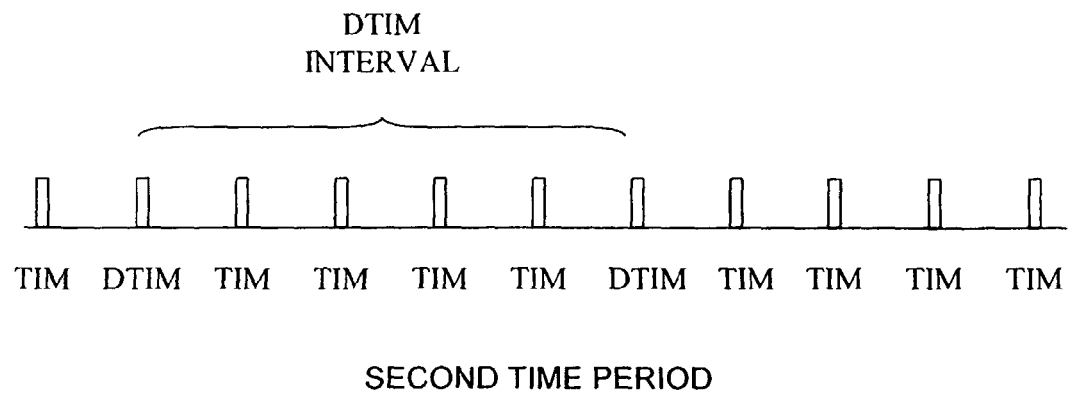

The interval adjustor 68 adjusts the interval value based on a predetermined criterion. The predetermined criterion may be based upon any of a wide variety of different parameters. In at least one embodiment following IEEE 802.11, for example, the predetermined criterion uses information related to one or more of the following parameters: (a) the frequency of multicast and/or broadcast traffic in the network, (b) the number of STAs in power save mode at a particular time, and (c) that amount of time that the STAs spend in the power save mode and how often the STAs come out of power save mode to check for broadcast/multicast traffic. The criterion can be configured, for example, to increase the DTIM value during periods of low broadcast/multicast traffic and decrease it during periods of high broadcast/multicast traffic. A running average of the broadcast/multicast traffic may be maintained within the AP 60. In one approach, as the number of STAs in power save mode increases within a BSS, the interval adjustor 68 will try to increase the DTIM value as high as possible taking the frequency of the multicast/broadcast traffic into account. Many additional and/or alternative parameters may also be used as part of the predetermined criterion. In at least one approach, a minimum interval value and a maximum interval value (e.g., a minimum DTIM interval and a maximum DTIM interval) are specified to place limits on the value generated by the interval adjustor 68. FIG. 5 is a diagram illustrating the dynamic adjustment of a DTIM interval in a wireless network from a first time period to a second time period within a BSS in accordance with an embodiment of the present invention. In one approach, interval updates are continuously generated by the interval adjustor 68 during network operation. In another approach, adjustments are made at periodic intervals. In still another approach, adjustments are made at predetermined times. Other update timing strategies may alternatively be used. It should be appreciated that the above described techniques are not limited to use within networks following the IEEE 802.11 standard, but may be used in any system that delivers broadcast and/or multicast traffic at specific time intervals.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
a power manager to control power consumption within a wireless transceiver; and
a plurality of power management profiles stored within the apparatus for use by the power manager, said plurality of power management profiles including at least a first profile having power management information specific to a first application type and a second profile including power management information specific to a second application type;
wherein said power manager is programmed to select and retrieve a power management profile from the plurality of power management profiles for use in performing power management for the wireless transceiver based on a type of application requesting transceiver services; and
wherein said first profile includes information indicative of typical transceiver usage patterns for said first application type and said second profile includes information indicative of typical transceiver usage patterns for said second application type.

2. The apparatus of claim 1, wherein:
said first profile is associated with Internet browser applications and said second profile is associated with email applications.

3. The apparatus of claim 1, wherein:
said first profile is associated with a first Internet browser application and said second profile is associated with a second, different Internet browser application.

4. The apparatus of claim 1, wherein:
said power manager is part of an operating system to be executed within the apparatus.

5. The apparatus of claim 1, comprising:
a wireless transceiver to be controlled by the power manager.

6. The apparatus of claim 1, comprising:
a port to attach a separate wireless transceiver.

7. The apparatus of claim 1, wherein:
said wireless transceiver is configured in accordance with the IEEE 802.11 wireless networking standard; and
said power manager performs power management for the wireless transceiver by managing the transition of the wireless transceiver between IEEE 802.11 active mode and IEEE 802.11 power save mode based on the selected power management profile.

8. A wireless transceiver module, comprising:
a battery to provide power to the wireless transceiver module;
a power manager to control power consumption within the wireless transceiver module; and
a plurality of power management profiles stored within the wireless transceiver module for use by the power manager, said plurality of power management profiles including at least a first profile including power management information specific to a first application type and a second profile including power management information specific to a second application type;
wherein said power manager is programmed to select and retrieve a power management profile from the plurality of power management profiles for use in performing power management based on a type of application requesting transceiver services; and
wherein said first profile includes information indicative of typical transceiver usage patterns for said first application type and said second profile includes information indicative of typical transceiver usage patterns for said second application type.

9. The wireless transceiver module of claim 8, wherein:
said wireless transceiver module includes a connector for removable insertion into a port of a user device.

10. The wireless transceiver module of claim 8, wherein:
said first profile is associated with Internet browser applications and said second profile is associated with email applications.

11. The wireless transceiver module of claim 8, wherein:
said first profile is associated with a first Internet browser application and said second profile is associated with a second, different Internet browser application.

12. The wireless transceiver module of claim 8, wherein:
said wireless transceiver module is configured in accordance with the IEEE 802.11 wireless networking standard; and
said power manager performs power management for the wireless transceiver module by managing the transition of a wireless transceiver between IEEE 802.11 active mode and IEEE 802.11 power save mode based on the selected power management profile.

13. A method comprising:
determining a type of application submitting a transmit request to a wireless transceiver;
selecting a power management profile corresponding to said application type from a group of power management profiles; and
performing power management for said wireless transceiver using the selected power management profile;
wherein said group of power management profiles includes at least a first profile having power management information specific to a first application type and a second profile including power management information specific to a second application type; and
wherein said first profile includes information indicative of typical transceiver usage patterns for said first application type and said second profile includes information indicative of typical transceiver usage patterns for said second application type.

14. The method of claim 13, wherein:
performing power management for said wireless transceiver includes switching said wireless transceiver between multiple power modes in accordance with the selected power management profile.

15. The method of claim 13, wherein:
said first profile is associated with Internet browser applications and said second profile is associated with email applications.

16. The method of claim 13, wherein:
said first profile is associated with a first Internet browser application and said second profile is associated with a second, different Internet browser application.

17. The method of claim 13, wherein:
said wireless transceiver is configured in accordance with the IEEE 802.11 wireless networking standard; and
performing power management includes managing the transition of the wireless transceiver between IEEE 802.11 active mode and IEEE 802.11 power save mode based on the selected power management profile.

18. An article comprising a computer readable storage medium having stored thereon instructions that, when executed by a computing platform, result in:
   determining a type of application submitting a transmit request to a wireless transceiver;
   selecting a power management profile corresponding to said application type from a group of power management profiles; and
   performing power management for said wireless transceiver using the selected power management profile;
   wherein said group of power management profiles includes at least a first profile having power management information specific to a first application type and a second profile having power management information specific to a second application type; and
   wherein said first profile includes information indicative of typical transceiver usage patterns for said first application type and said second profile includes information indicative of typical transceiver usage patterns for said second application type.

19. The article of claim 18, wherein:
performing power management for said wireless transceiver includes switching said wireless transceiver between multiple power modes in accordance with the selected power management profile.

20. The article of claim 18, wherein:
said group of power management profiles are stored on said storage medium.

21. The article of claim 18, wherein:
said first profile is associated with Internet browser applications and said second profile is associated with email applications.

22. The article of claim 18, wherein:
said first profile is associated with a first Internet browser application and said second profile is associated with a second, different Internet browser application.

23. The article of claim 18, wherein:
said wireless transceiver is configured in accordance with the IEEE 802.11 wireless networking standard; and
performing power management includes managing the transition of the wireless transceiver between IEEE 802.11 active mode and IEEE 802.11 power save mode based on the selected power management profile.

* * * * *